July 14, 1925.
F. J. HINDERLITER
ECCENTRIC COMBINATION SOCKET
Filed March 12, 1923
1,545,830
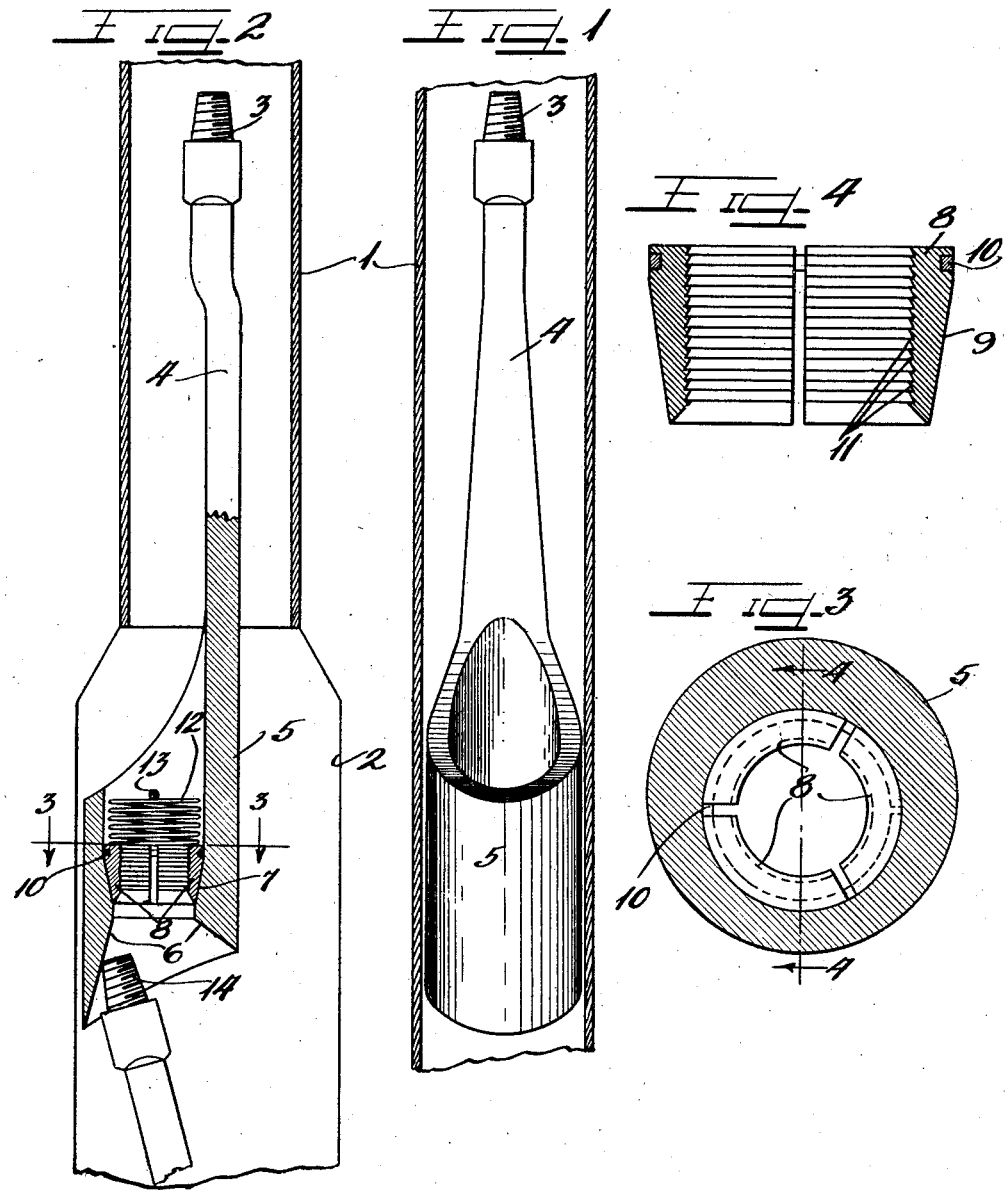

Patented July 14, 1925.

1,545,830

UNITED STATES PATENT OFFICE.

FRANK J. HINDERLITER, OF TULSA, OKLAHOMA.

ECCENTRIC COMBINATION SOCKET.

Application filed March 12, 1923. Serial No. 624,307.

*To all whom it may concern:*

Be it known that I, FRANK J. HINDERLITER, a citizen of the United States, and a resident of the city of Tulsa, in the county of Tulsa and State of Oklahoma, have invented certain new and useful Improvements in an Eccentric Combination Socket; and I do hereby declare that the following is a full, clear, and exact description of the same, reference being had to the accompanying drawings, and to the numerals of reference marked thereon, which form a part of this specification.

This invention relates to fishing tools for recovering uncoupled or broken rods in a deep well or prospecting hole, as in oil or well or core drilling.

Heretofore taper taps or spears for engagement with female couplings and bell taps for engagement with male couplings or the outside of rods have been used, as rod breakage and uncoupling has been a frequent and unavoidable happening in deep drilling operations. Such fishing tools are difficult to manage at the end of a long string of tools and it is largely a matter of luck as to how soon the broken or uncoupled rods at the bottom of the hole can be recovered. Frequently it has been impossible to recover the rods at all, in which case the hole must be abandoned or a wedge inserted above the rods and the drilling rods deflected to one side thereby to pass the abandoned rods. The unreliability and expense of such a procedure will be readily evident, and improvements in fishing tools that will eliminate a large part of the delays and losses inherent in the use of the old forms are correspondingly valuable.

It is a common occurrence when fishing for lost tools at the bottom of a drill hole to find that from any one or more of a numerous number of causes the drill hole is enlarged around the point of the break or uncoupling and that the head of the string of lost tools lays over to one side of the enlarged bore outside the radius of the drill hole proper so that no ordinary fishing tool can be brought into position to grip the head of the tools to hoist them out. A bell tap as heretofore used must be brought over the tip of the string of tools and screwed down onto them to obtain a grip. Manifestly this would be impossible of accomplishment if the tip or head of the string lies to one side of the bore of the drill hole.

The present invention contemplates improvements in fishing tools intended to successfully operate under such difficult conditions without the necessity of rotating the fishing tool to grip the head of the lost string of tools.

It is an important object of this invention to provide an offset or eccentric type of enveloping fishing tool that will operate as well when the drill hole is enlarged about the break in the tools as when the broken end is concentric with the drill hole.

It is another important object of this invention to provide a novel gripping mechanism for recovering lost tools that will operate by being forced downward over the head of the string of tools and serve to hoist them to the surface.

It is a further object of this invention to provide a fishing socket that will follow the walls of a drill hole so that in case of an enlargement thereof the socket will swing out to extend over the bit or tool being fished for.

Other and further important objects of this invention will be apparent from the disclosures in the specification and the accompanying drawings.

The invention (in a preferred form) is illustrated in the drawings and hereinafter more fully described.

On the drawings:

Figure 1 is a fragmentary section of a drill hole with a device embodying the features of this invention suspended therein.

Figure 2 is a fragmentary section of a drill hole with a partial section of the device of this invention in a position preparatory to gripping the coupling of a lost tool.

Figure 3 is an enlarged section on the line 3—3 of Figure 2.

Figure 4 is an enlarged section on the line 4—4 of Figure 3.

As shown on the drawings:

The reference numeral 1 refers to the well casing commonly used when drilling through broken rock strata, sand, clay, and the like. In some methods of drilling, as for oil and artesian wells, a casing is almost essential for the full depth of the well, while in core drilling such a casing is rarely used except as a lining down to bedrock. In the illustration, Fig. 2, the casing is assumed to follow the cutting bit which cuts a large enough hole to allow driving the casing as the cutting continues. Under such circumstances, the hole below the casing will be larger in diameter as indicated by the numeral 2, and if the drilling bits, or stems, jars, rope sockets, bailers, sand pumps, rods, casing and the like have been uncoupled or broken off, the tip thereof may naturally fall off to one side of the hole out of line with the casing bore down which any recovering tools must be lowered.

A preferred form of the device of this invention comprises a coupling member 3 adapted to be secured to a string of rods or jars for lowering into the hole, an elongated shank portion 4 slightly offset so that one side thereof will be in line with the outside diameter of the coupling member, and a socket 5 at the end of the shank portion and offset in a direction opposite to that of the first offset. The lower end of said socket 5 is formed at an angle, with its lowermost point diametrically opposite to the shank portion 4, as seen in Figure 2, the result being that this point, which first engages the tool head 14, will be offset materially to one side of the coupling member 3 and shank portion 4. The socket 5 comprises an apertured member substantially cylindrical externally; the aperture being slightly eccentric thereto and comprising a bell-like tapered mouth 6 adapted to center the tip 14 of a tool or the like and guide it into the gripping mechanism as the socket is lowered. Above the bell mouth the aperture tapers in the reverse direction or outwardly, as shown at 7, to form a seat for the gripping mechanism to be described hereinafter, and then continues through the socket at substantially the diameter of the large end of the taper 7.

The gripping mechanism comprises a plurality of segments 8 having an outer tapered surface 9 to match the taper 7. A snap ring 10 serves to hold the various segments in proper relationship and to normally close the gaps left between the segments due to the process of manufacture. The segments are formed by cutting up an annular ring machined into the proper form. Internally the segments have teeth 11 of a saw form as distinct from an ordinary thread form to give a grip for an upward pull. As shown in the figures, however, these segments are separated to the fullest extent permitted by the diameter of the socket, as when the head of the tool 14 is about to enter the ring of segments. Normally the segments will be pressed down into the taper 7 by a spring 12 acting against a removable pin 13 inserted through the walls of the socket. In use with cable drilling rigs the coupling end 3 of the socket is screwed into the jars on the bottom of a stem and then lowered into the hole. The socket holds the string of tools connected thereto over to one side of the casing as in Fig. 1 until the lower end of the socket 5 comes to the enlarged part 2 of the hole when it swings out in the larger hole as in Fig. 2, with its lowermost point close to the wall of said enlarged part 2 and the tools above the socket swing to the center of the casing. Then by lowering the string of tools carrying the socket it will engage over the head of the lost tool and continued lowering will force this head into the segments 8 which yield and spread out in the taper 7 to allow entry of the head. Upon hoisting the spring 12 and taper 7 tend to contract the segment 8 and cause the teeth 11 to bite into the head 14 and grip the same to hoist it out of the hole.

In cable drilling rigs it is manifestly impossible to rotate a bell tap to grip such a lost tool, and even if it were possible to positively rotate the recovering tools, the lost tools might be loose in the hole and turn therewith so that the recovering tools would not secure a firm enough grip thereon to enable them to withstand the lifting strain.

This invention is equally applicable to core drilling outfits wherein a line of coupled rods extends to the surface where a rotary movement can be applied if necessary, as the lost tools may not be jammed in the hole so that a tap can be screwed thereon. In this invention the recovery tools secure a grip without rotation so that a loose tool can be recovered as easily as a jammed tool.

I am aware that numerous details of construction may be varied through a wide range without departing from the principles of this invention, and I therefore do not purpose limiting the patent granted otherwise than necessitated by the prior art.

I claim as my invention:

1. In a tool of the class described, a socket formed at an angle at its lower end and offset with respect to the supporting point thereof, the lowermost point of said angled lower end being diametrically opposite to its supporting point, and expansible gripping means therein adapted to engage with the top of an object to be lifted.

2. In a tool of the class described, a socket formed at an angle at its lower end and offset with respect to the supporting point thereof, the lowermost point of said angled lower end being diametrically opposite to its supporting point, expansible gripping means therein, and resilient means for normally retaining said gripping means in a contracted state.

In testimony whereof I have hereunto subscribed my name in the presence of two subscribing witnesses.

FRANK J. HINDERLITER.

Witnesses:
HERMAN B. HENDERSHOT,
A. G. LOTT.